United States Patent [19]

Dixon et al.

[11] 4,247,500
[45] Jan. 27, 1981

[54] FABRICATION OF FERRITE MATERIAL

[75] Inventors: Melvyn Dixon; Bhaskar B. Ghate, both of Bethlehem; Ronald J. A. Holmes, Northampton; Curtis E. Pass, Bethlehem, all of Pa.

[73] Assignee: Bell Telephone Laboratories, Incorporated, Murray Hill, N.J.

[21] Appl. No.: 101,162

[22] Filed: Dec. 7, 1979

[51] Int. Cl.³ .............................................. C04B 35/26
[52] U.S. Cl. .................. 264/63; 252/62.56; 252/62.62
[58] Field of Search .............. 264/61, 63; 252/62.56, 252/62.62

[56] References Cited

U.S. PATENT DOCUMENTS

| | | | |
|---|---|---|---|
| 3,031,407 | 4/1962 | Marco | 264/63 |
| 3,054,752 | 9/1962 | Leaycraft | 252/62.56 |
| 3,232,877 | 2/1966 | Vassiliev | 252/62.56 |
| 3,371,044 | 2/1968 | Cochardt | 264/61 |

OTHER PUBLICATIONS

Pincus et al., "The Role of Organic Binders in Ceramic Processing," *Ceramic Industry Magazine,* Apr. 1969, pp. 106–109, 146.

Slick, "A Thermogravimetric Study of the Equilibrium Relations between a Mn–Zn Ferrite and an $O_2$–$N_2$ Atmosphere," *Ferrites, Proceedings of the International Conference,* Jul. 1970, Japan, pp. 81–83.

Hoffman, "Importance of Binders in Spray Dried Pressbodies," *Ceramic Bulletin,* vol. 51, No. 3 (1972) pp. 240–242.

*Primary Examiner*—John Parrish
*Attorney, Agent, or Firm*—Lester H. Birnbaum

[57] ABSTRACT

A method of fabricating ferrite material which results in high permeability and/or fast thruputs. Binder systems are employed such that the components burn out completely and sequentially during sintering and result in the proper grain size and surface properties for high permeability in the ferrite material. In particular, the binder system comprises polyvinyl alcohol, polyvinyl pyrrolidone and methyl cellulose.

7 Claims, 8 Drawing Figures

4,247,500

FABRICATION OF FERRITE MATERIAL

BACKGROUND OF THE INVENTION

This invention relates to the fabrication of ferrite bodies, and in particular to the use of proper binder systems for achieving high permeability and/or fast thruputs in production.

Ferrites are generally defined as compounds of ferric oxide, $Fe_2O_3$, and a metallic oxide, MeO, where Me can be iron, manganese, zinc, cobalt, nickel, cadmium, magnesium or mixtures thereof. Such materials enjoy a wide use, for example, as magnetic cores in loading coils, choke coils and transformers, and as the gyromagnetic material in microwave circulators and isolators.

In the fabrication of ferrite materials a "binder system" is generally employed. This system usually includes (1) a dispersant to improve the solids to liquid ratio and facilitate milling, (2) an organic binder to impart green strength to the part fabricated by a suitable means such as pressing or slip casting, (3) a plasticizer to improve toughness and flexibility of the binder film and (4) a lubricant to minimize particle-to-particle friction and die wall friction during pressing.

The choice of a binder system will affect many important characteristics of the final product. For example, it is known that permeability is related to the grain size of the ferrite, although other factors such as zinc loss play a role. The choice of a binder to a large extent determines whether the proper grain size is achieved in a sufficiently short time to attain high permeability. Utilizing a typical prior art binder system comprising gum arabic, zinc stearate and polyvinyl alcohol, the maximum permeability generally obtained was 18,000. It is desirable to produce permeabilities of at least 20,000 for certain applications.

It is also desirable, for fast thruputs in production, to achieve a short firing cycle in the sintering of the material. The binder system will also have an effect on such firing times. For example, with the prior art binder system previously described, a firing cycle of 12 hours which includes a 6 hour soak time at 1345 degrees C. was typically required to produce permeabilities in the range of 4,000–8,000 in a standard 26/16 IEC type pot core. For economy in manufacture, a considerable shortening of the firing time is desirable.

It is therefore an object of the invention to provide a method for achieving high permeability ferrite bodies. It is a further object of the invention to produce medium range permeability ferrite bodies with a shortened firing cycle.

SUMMARY OF THE INVENTION

These and other objects are achieved in accordance with the invention. The invention is a method for fabricating a ferrite body which includes the steps of mixing component powders of the ferrite, calcining to form a ferrite spinel compound, and reducing the particle size of the compound to form a slurry. A binder system is added to the slurry which is then converted into a dry powder suitable for pressing. The powder is pressed into the desired shape and heated to burn out the binder and further sintered to attain the desired permeability. The binder system comprises a mixture of polyvinyl alcohol, polyvinyl pyrrolidone, and methyl cellulose.

BRIEF DESCRIPTION OF THE DRAWING

These and other features will be delineated in detail in the following description. In the drawing.

DETAILED DESCRIPTION

Figure 1:
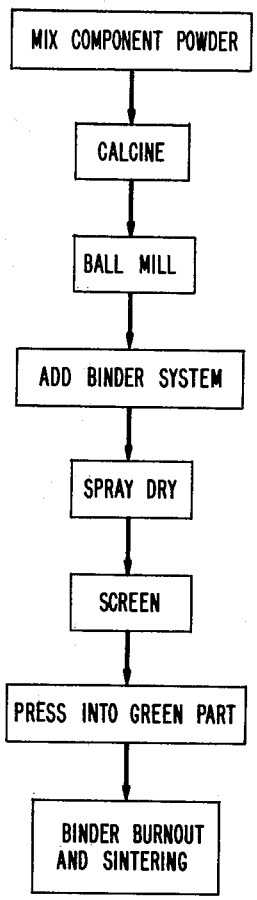
FIG. 1 is a flow diagram showing the major fabrication steps in accordance with one embodiment of the invention.

The invention will be described with reference to the flow diagram in FIG. 1. First, the raw materials of the ferrite, which are in the form of dry powders, are mixed together. In this example, the raw materials were a ferrite grade $Fe_2O_3$ such as grade 2999R sold by Pfizer Company, an analytical grade $MnCO_3$ such as that sold by Baker Chemicals, and a high purity grade ZnO such as that sold by New Jersey Zinc Company. The components were mixed in the following approximate proportions: 52.6 mole percent $Fe_2O_3$, 23.1 mole percent $MnCO_3$ and 24.3 mole percent ZnO. This, of course, is only one example of compositions suitable for high permeability ferrites. It appears that the proportions may be varied as follows: 51–53.5 mole percent $Fe_2O_3$, 21–27 mole percent $MnCO_3$ and 21–26 mole percent ZnO. The mixture was then calcined to cause the components to react and start the formation of a ferrite spinel compound. This typically involves heating the powder in air at a temperature of 800–1,000 degrees C. for 2–24 hours. In this particular example, heating was done at 900 degrees C. for 16 hours.

The calcined material, approximately 75 percent of which was spinel compound, was then ball-milled to produce a slurry. A standard ball mill was employed which included twelve-gallon stainless-steel jars and stainless-steel balls. The total ball milling time was approximately 2 hours. At the start of milling, a dispersant and water were added to the calcined powder in the ball mill. The use of the dispersant is not essential for the practice of the invention, but is useful to facilitate milling and maintain a high solids/liquid ratio. In this example, the dispersant was polyethylene imine (Polymin P ®) in an amount of 0.4 weight percent. Alternatively, ammonium citrate may be used as a dispersant. (See, U.S. patent application of D. W. Johnson and E. M. Vogel, Ser. No. 929,930, filed Aug. 1, 1978, and assigned to the present assignee). Generally, the slurry should be ball-milled until a viscosity within the range of 50–400 cp is obtained.

After ball-milling, the binder components in accordance with the invention were mixed with the slurry in a standard Hobart Planetary Mixer.

In accordance with the invention, the binder system has three basic characteristics. First, the components should burn out completely during the subsequent heating step, since any residue tends to influence the densification and grain growth of the ferrite body during sintering. Second, the components should burn out sequentially to prevent excess strain on the ferrite due to escaping gases. Finally, the components on burning should give the final product the proper grain size and microstructure which will result in good magnetic properties such as high permeability. In order to meet these properties, it appears that the components should have molecular weights in the range of 200–500 mer and should be film formers. In addition, it appears that the components should not have complex radicals which tend to attach themselves to the surface of the ferrite. Examples of such radicals are those which include Cl, N or sulfate ions.

In accordance with one embodiment of the invention, the binder system used was a mixture of polyvinyl alcohol, polyvinyl pyrrolidone, and methyl cellulose.

In this example, the polyvinyl alcohol was Gelvatol ® grade 20-30 purchased from Monsanto Company, the polyvinyl pyrrolidone was a commercial grade purchased from Arthur Thomas Company and the methyl cellulose was Methocel grade A25 purchased from Dow Chemicals. The polyvinyl alcohol and polyvinyl pyrrolidone were added in the form of 20 weight percent solutions and the methyl cellulose in the form of a 2 weight percent solution. In this particular example, the proportions were 0.6 weight percent polyvinyl alcohol, 0.3 weight percent polyvinyl pyrrolidone and 0.03 weight percent methyl cellulose, the weight percents being based on the weight of the dry ferrite powder at the start of milling. It appears that the proportions of the components can be varied as follows for good magnetic properties: 0.4–1.6 weight percent polyvinyl alcohol, 0.2–1.0 weight percent polyvinyl pyrrolidone and 0.03–0.1 weight percent methyl cellulose.

The slurry was then spray dried in accordance with standard techniques to produce a powder. In this particular example, the material was propelled through a fine nozzle at a flow rate of approximately 100 cc/min. with an inlet temperature of 320 degrees C. and an exit temperature of 150 degrees C.

Figure 2:
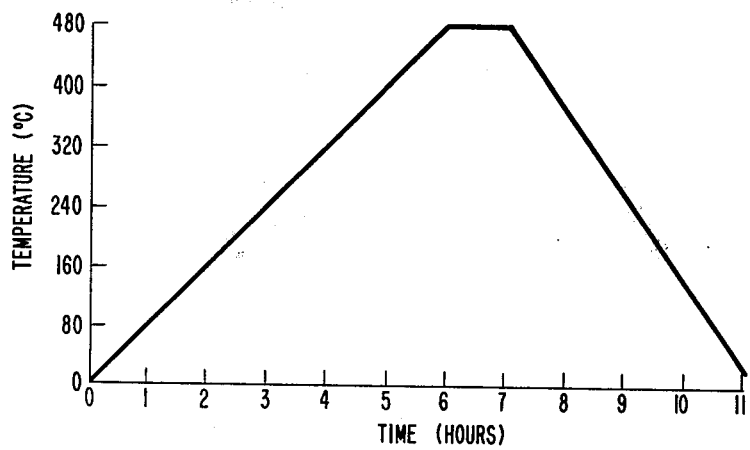
FIGS. 2 and 3 are illustrations of a firing cycle useful for sintering the ferrite in accordance with one embodiment of the invention to produce high permeability ferrites.
Figure 3:
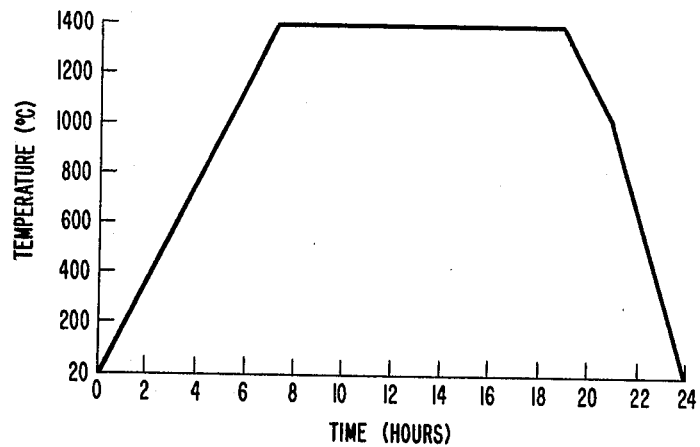

After screening the resulting powder through a 325 U.S. Sieve, the material remaining on the screen was pressed into the desired shape. In this example, toroids of 0.260" outer diameter, 0.090" inner diameter and 0.110" height were pressed from the powder to a pressed density of 3.0 gm/cm$^3$. The bodies were then subjected to a firing cycle as shown in FIGS. 2 and 3. FIG. 2 shows a separate heating step to burn out the binder components, while FIG. 3 shows the sintering step to achieve the desired magnetic properties. A separate binder burn-out step is desirable if large parts are being formed and a small volume furnace is employed since the gases evolved during burn out could have an effect on sintering. In most commerical processes, a separate burn out cycle will not be needed. The binder burn out was performed in air. In the initial portion of the sintering cycle of FIG. 3, the temperature was increased at a rate of 200 degrees/hour until the temperature reached approximately 1400 degrees C. The temperature was then held at 1400 degrees C. for approximately 12 hours (i.e., the soak time) and thereafter cooling was effected at 200 degrees C./hour to 1000 degrees C., and at 400 degrees C./hour from 1000 degrees C. to room temperature. According to standard practice, initial heating took place in an atmosphere of pure $O_2$ which was switched near the end of the soak time to a preselected mixture of $N_2+O_2$. The ferrite was equilibrated with this atmosphere for 15 minutes. Initial cooling was done in an equilibrium atmosphere of $N_2+O_2$ wherein the $O_2$ content steadily dropped with temperature and final cooling below 1100 degrees C. took place in pure $N_2$ (see Slick, "A Thermogravimetric Study of the Equilibrium Relations Between a Mn-Zn Ferrite and an $O_2$-$N_2$ Atmosphere," *Ferrites: Proceedings of the International Conference,* July 1970, pages 81–83). For high permeability a recommended range of peak temperature is 1350–1450 degrees C. and a recommended soak time is 8–14 hours.

Figure 4:
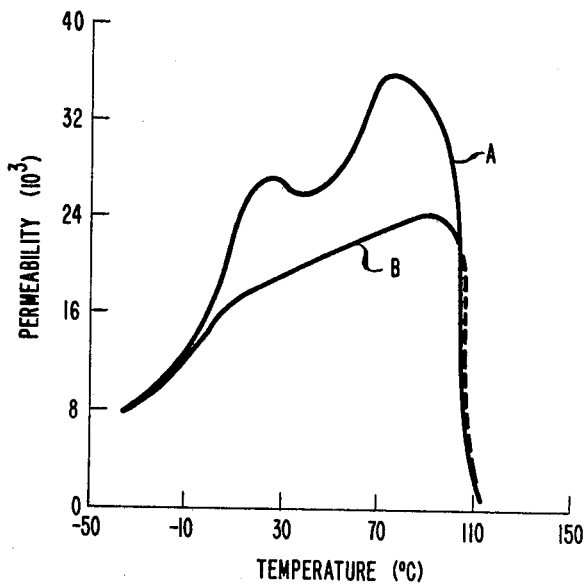
FIG. 4 is a plot of permeability of the ferrite as a function of temperature when fabricated in accordance with one embodiment of the invention as compared to a prior art process.

FIG. 4 shows the permeability of the resulting ferrite body made in accordance with the above-described embodiment of the invention (curve A) as compared to a ferrite made utilizing a binder system comprising gum arabic, zinc stearate and polyvinyl alcohol in accordance with the prior art (curve B). It will be noted that with the present binder system, a permeability of over 25,000 was achieved at room temperature.

Figure 6:
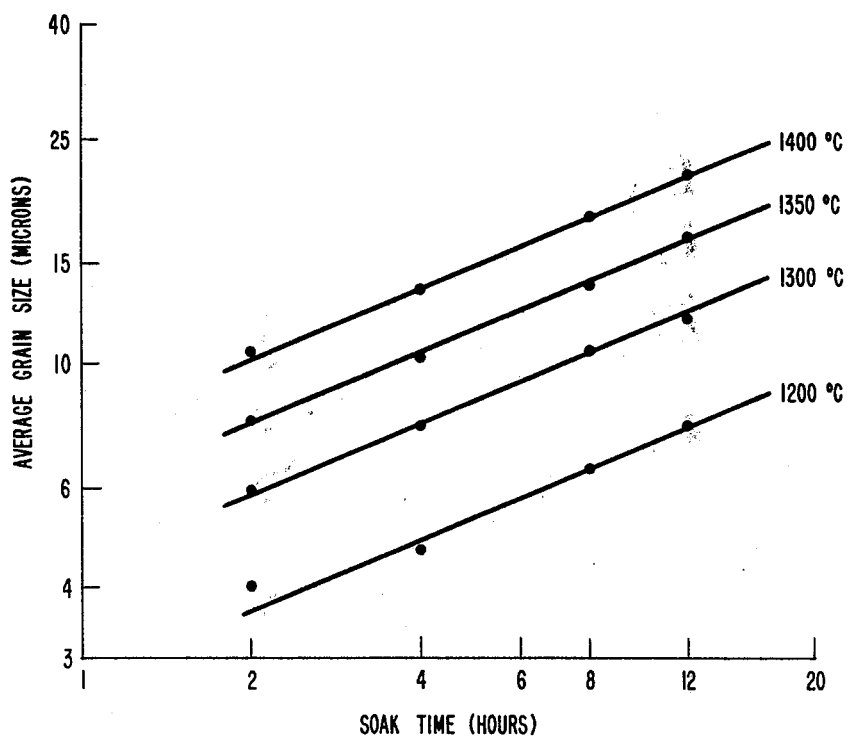
FIG. 6 is a graph of the grain size of the ferrite as a function of sintering time for different temperatures in accordance with one example of the prior art.
Figure 7:
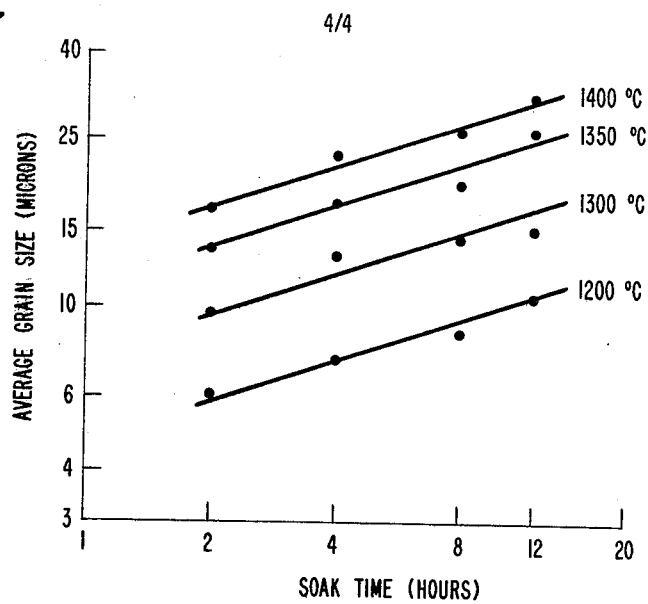
FIG. 7 is a graph of the grain size of the ferrite as a function of sintering time for different temperatures in accordance with one embodiment of the invention.
Figure 8:
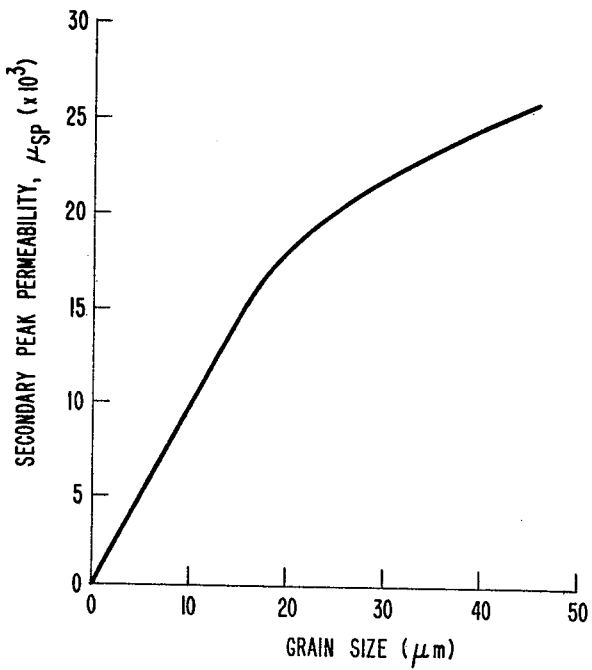
FIG. 8 is a graph of secondary peak permeability as a function of grain size in accordance with one embodiment of the invention.

The reason the use of the present binder results in higher permeability is apparently due to the large grain size produced in relatively short periods of time. This is demonstrated by FIGS. 6 and 7 which compare grain size as a function of soak time at different temperatures when the prior art binder of gum arabic, zinc stearate and polyvinyl alcohol was used and when the present binder was used. FIG. 8 shows how the secondary peak permeability is related to grain size.

Figure 5:
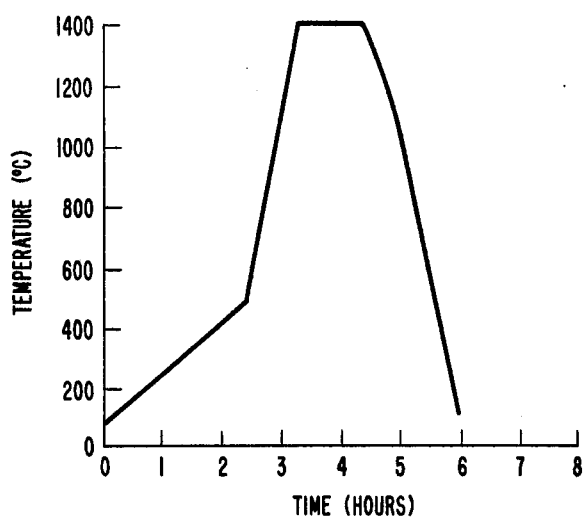
FIG. 5 is an illustration of a firing cycle useful for sintering the ferrite in accordance with one embodiment of the invention to produce a medium range permeability ferrite.

The binder composition in accordance with this example also provides an additional advantage in providing fast thruputs in production. This was demonstrated by the fabrication of ferrites with medium range permeabilities (4,000–8,000). The above procedure was repeated except that the firing cycle times were altered as shown in FIG. 5 and initial heating was done in an atmosphere of 5% $O_2$ in $N_2$. It was found that only a six hour firing cycle with a one hour soak time at the top temperature of 1350 degrees C. was needed to produce the desired permeabilities in the 4,000–8,000 range. To obtain similar results with the prior art binder system, at least 6 hours of soak time at the temperature of 1350 degrees C. was needed. In general, for producing medium range permeability ferrites in accordance with the invention, a soak time of ½–3 hours at temperatures in the range 1250–1400 degrees C. is recommended.

It will be noted that the methyl cellulose component of the present binder system will also provide the general properties of plasticizer, dispersant and lubricant. Thus, additional ingredients are not necessary. However, if desired, additional components providing these properties may be added. In addition to the additional dispersant previously described, it may be desirable to also add an additional plasticizer. For example, polyoxyethylene aryl ether (generally know as Pycal ®) can be used conveniently.

Various additional modifications will become apparent to those skilled in the art. All such variations which basically rely on the teachings through which the invention has advanced the art are properly considered within the spirit and scope of the invention.

We claim:

1. A method for fabricating a ferrite body comprising the steps of mixing component powders of the ferrite, calcining to form a ferrite spinel compound, converting said compound into a slurry, adding a binder system to said slurry, converting said slurry into a dry powder, pressing the powder into the desired shape of the body, heating the body to burn out the binder, and further heating the body to establish a desired permeability for the ferrite body, wherein the improvement is that said binder system comprises a mixture of polyvinyl alcohol, polyvinyl pyrrolidone, and methyl cellulose.

2. The method according to claim 1 wherein the permeability of the resulting ferrite body at room temperature is at least 20,000.

3. The method according to claim 1 wherein the proportions of components of the binder system, based on the weight of the dry ferrite powder prior to forming a slurry, is: 0.4–1.6 weight percent of polyvinyl alcohol, 0.2–1.0 weight percent of polyvinyl pyrrolidone, and 0.03–0.1 weight percent methyl cellulose.

4. The method according to claim 1 wherein during the heating of the body, the temperature is held at the peak temperature of 1250–1350 degrees C. for 1–3 hours and the permeability of the resulting ferrite is within the range 4,000–8,000.

5. The method according to claim 1 wherein the binder system further comprises a dispersant selected from the group consisting of polyethylene imine and ammonium citrate, and a plasticizer comprising polyoxyethylene aryl ether.

6. The method according to claim 1 wherein the binder system consists essentially of said mixture of polyvinyl alcohol, polyvinyl pyrrolidone and methyl cellulose.

7. The method according to claim 1 wherein said component powders comprise $Fe_2O_3$, $MnCO_3$ and $ZnO$.

* * * * *